US012649454B2

(12) United States Patent
Tatebe et al.

(10) Patent No.: US 12,649,454 B2
(45) Date of Patent: Jun. 9, 2026

(54) INFORMATION TRANSMISSION APPARATUS

(71) Applicant: SUBARU CORPORATION, Tokyo (JP)

(72) Inventors: Takanori Tatebe, Tokyo (JP); Naoto Yabuki, Tokyo (JP); Kazuki Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/867,513

(22) PCT Filed: Jan. 18, 2023

(86) PCT No.: PCT/JP2023/001328
§ 371 (c)(1),
(2) Date: Nov. 20, 2024

(87) PCT Pub. No.: WO2024/154252
PCT Pub. Date: Jul. 25, 2024

(65) Prior Publication Data
US 2025/0340196 A1     Nov. 6, 2025

(51) Int. Cl.
B60W 50/16          (2020.01)
B60W 10/20          (2006.01)

(52) U.S. Cl.
CPC ............ B60W 10/20 (2013.01); B60W 50/16 (2013.01)

(58) Field of Classification Search
CPC ...... G10K 15/04; B60W 10/20; B60W 50/16; B60R 11/02; H04R 3/00; H04S 7/00;
(Continued)

(56) References Cited

U.S. PATENT DOCUMENTS 12,043,329 B2 *   7/2024   Tsukasaki ............ B62D 15/025
2016/0157041 A1   6/2016   Shiozawa et al.
(Continued)

FOREIGN PATENT DOCUMENTS

JP      2016-145884 A     8/2016
JP      2022-119227 A     8/2022
WO      2014/174839 A1    10/2014

OTHER PUBLICATIONS

International Search Report (with English translation) and Written Opinion dated Apr. 18, 2023, from corresponding International Application No. PCT/JP2023/001328, 8 pages.

*Primary Examiner* — Hai H Huynh
*Assistant Examiner* — Johnny H Hoang
(74) *Attorney, Agent, or Firm* — Rimon P.C.

(57)          ABSTRACT

An information transmission apparatus configured to be provided on a vehicle that includes a steering device 1 configured to steer a wheel includes a parameter detector, a vibrator, a rotation center calculator, and a gain adjuster. The parameter detector is configured to detect a parameter σ that correlates with a steering amount of the steering device. The vibrator is configured to vibrate air around an occupant based on a predetermined vibration waveform in accordance with a change in the parameter of the steering device. The rotation center calculator is configured to calculate a position of a rotation center of a yaw behavior of a body of the vehicle. The gain adjuster is configured to adjust an output gain of the vibration waveform in accordance with a relative position between the rotation center and a seating position of the occupant.

13 Claims, 16 Drawing Sheets

(58) Field of Classification Search
CPC .. B62D 15/025; B62D 5/0463; B62D 5/0409;
B62D 6/002
USPC ..................................................... 701/41–48
See application file for complete search history.

(56) References Cited

U.S. PATENT DOCUMENTS

| | | | | |
|---|---|---|---|---|
| 2023/0356603 A1* | 11/2023 | Hirao | .................... | B60W 10/10 |
| 2023/0391333 A1* | 12/2023 | Baba | .................... | B60W 30/09 |
| 2025/0266030 A1* | 8/2025 | Maeda | .................... | B60L 58/12 |

* cited by examiner

[ FIG. 1 ]
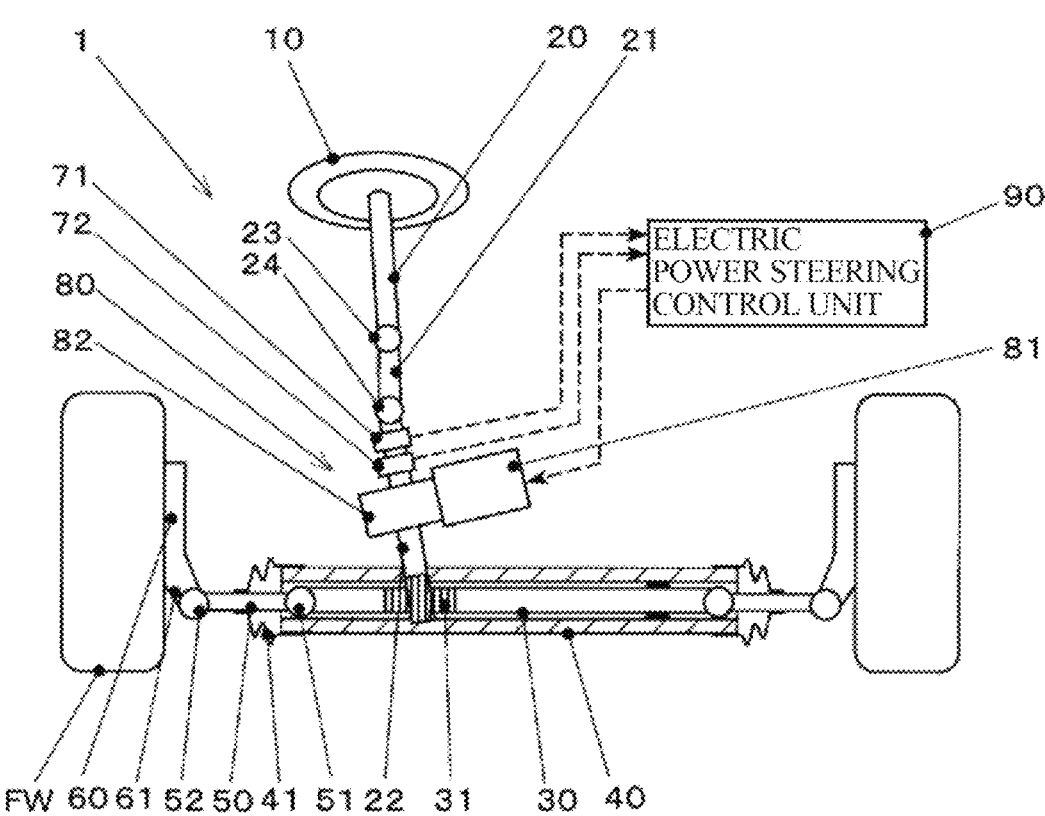

[FIG. 2]
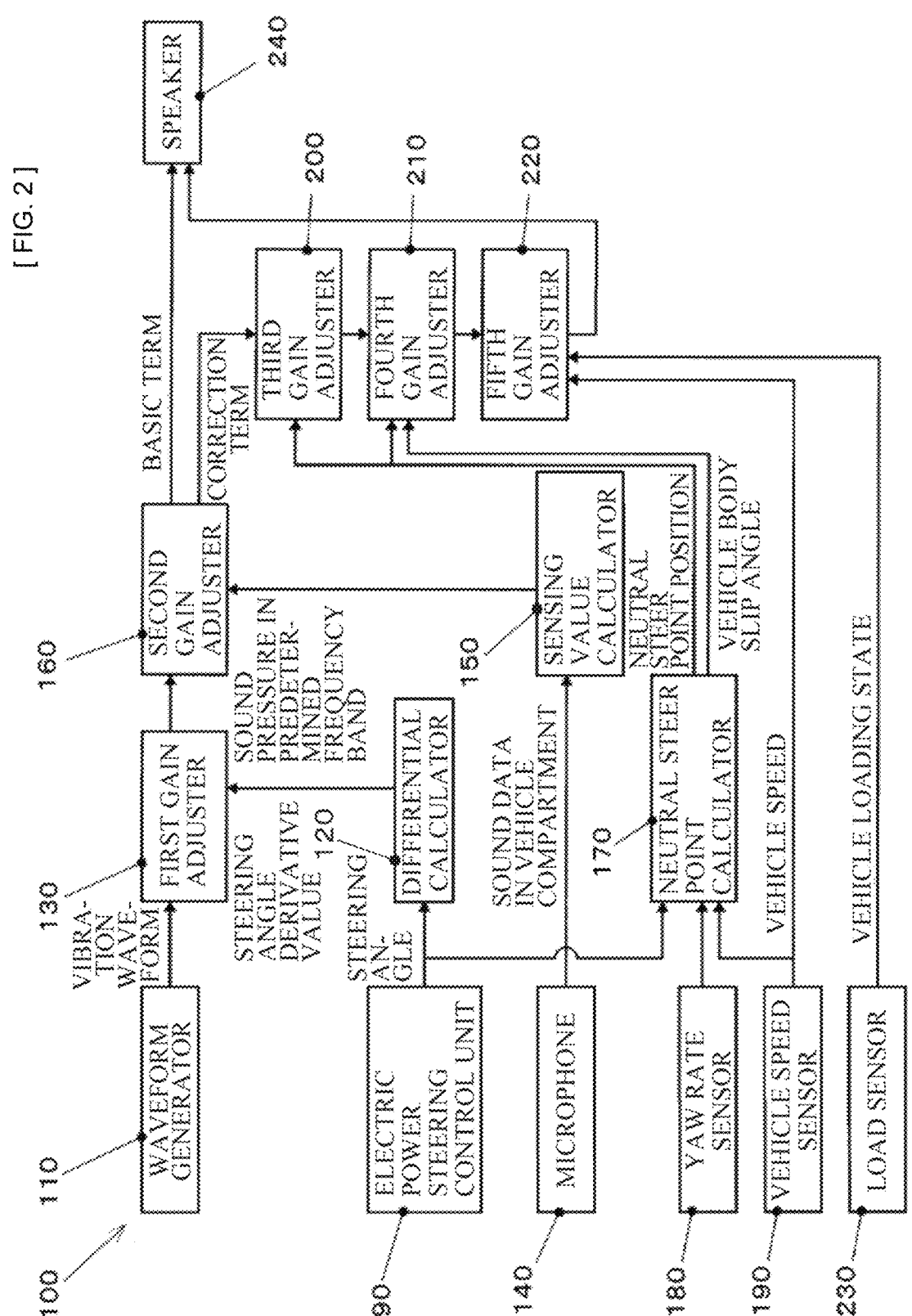

[ FIG. 3 ]
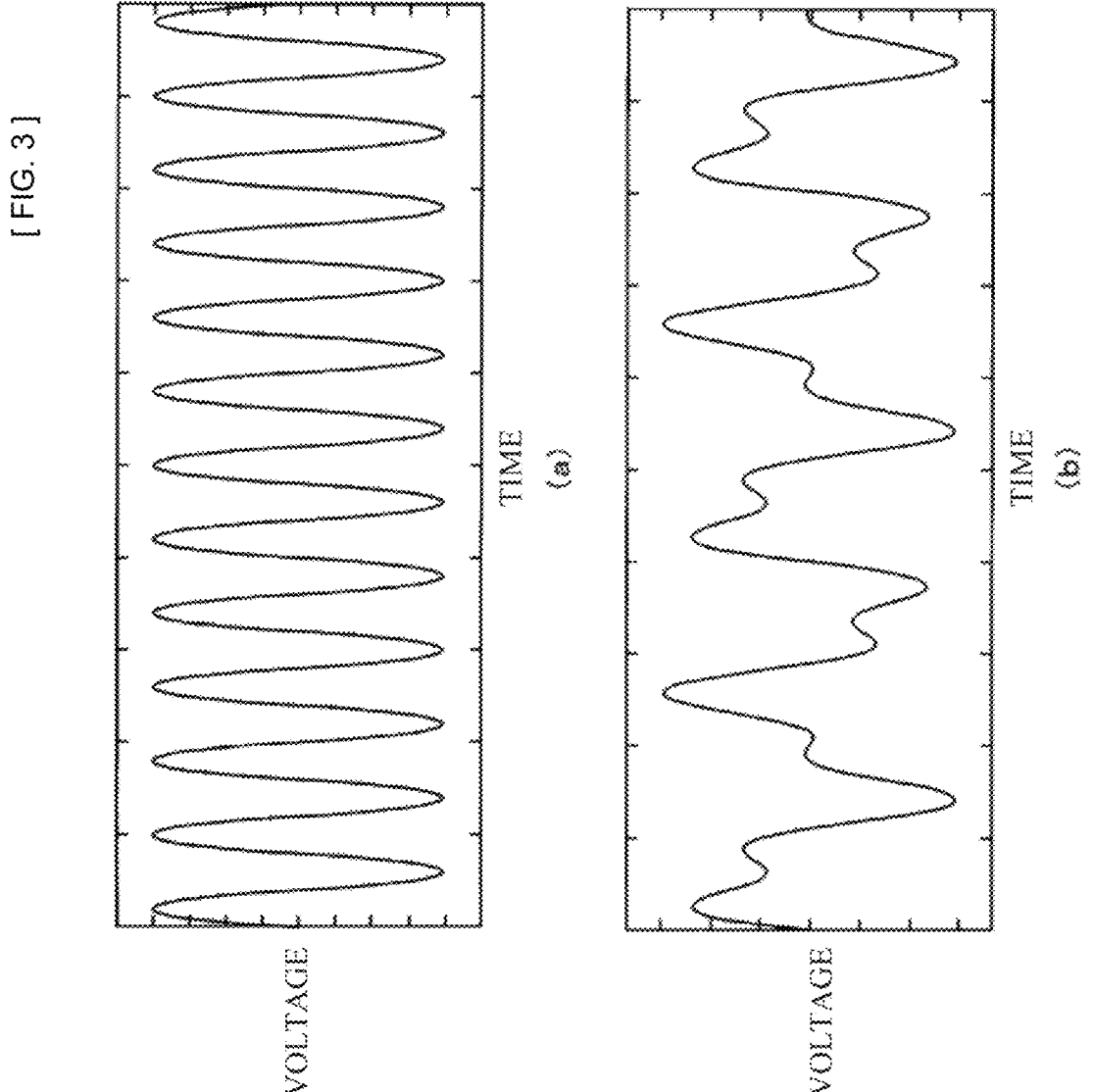

[ FIG. 4 ]
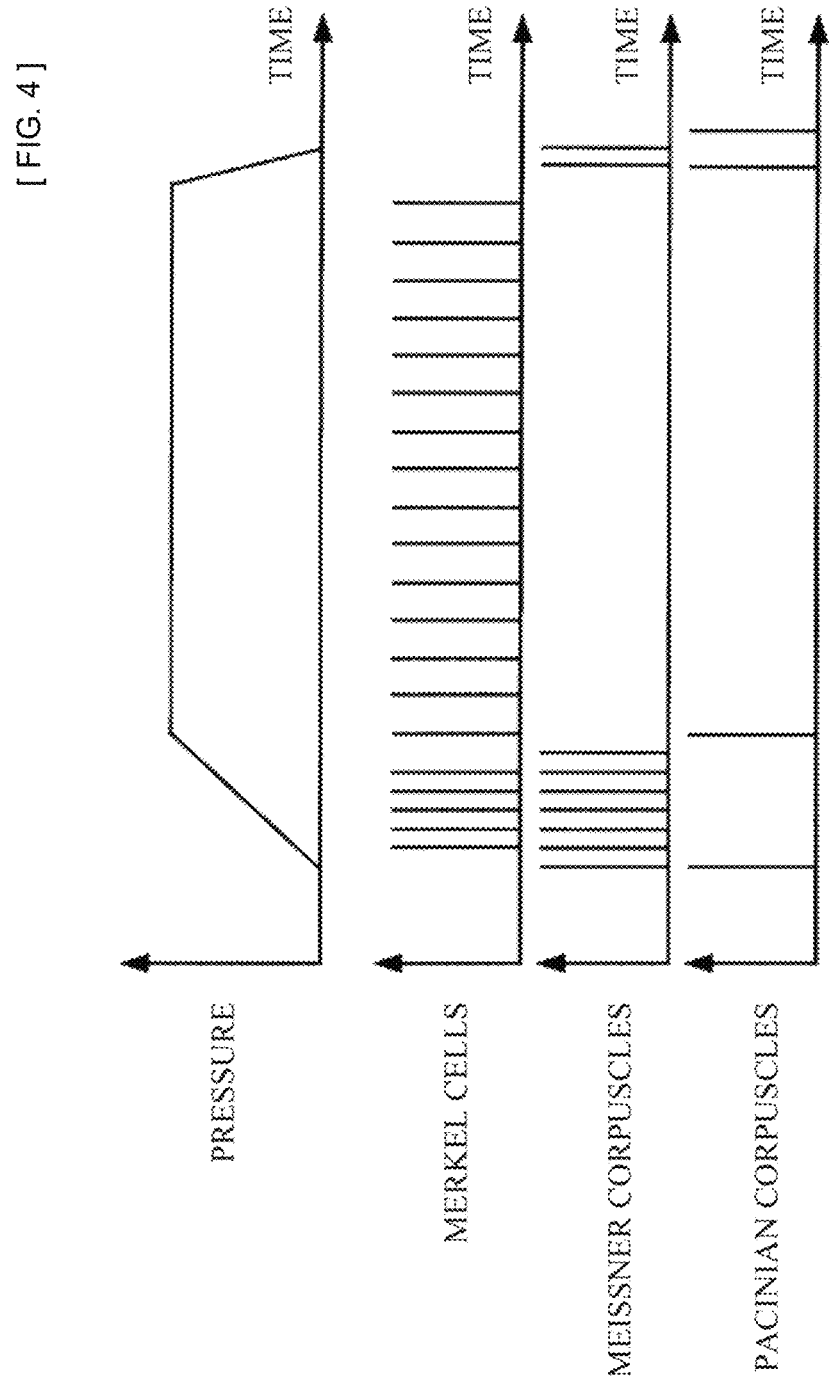

[ FIG. 5 ]
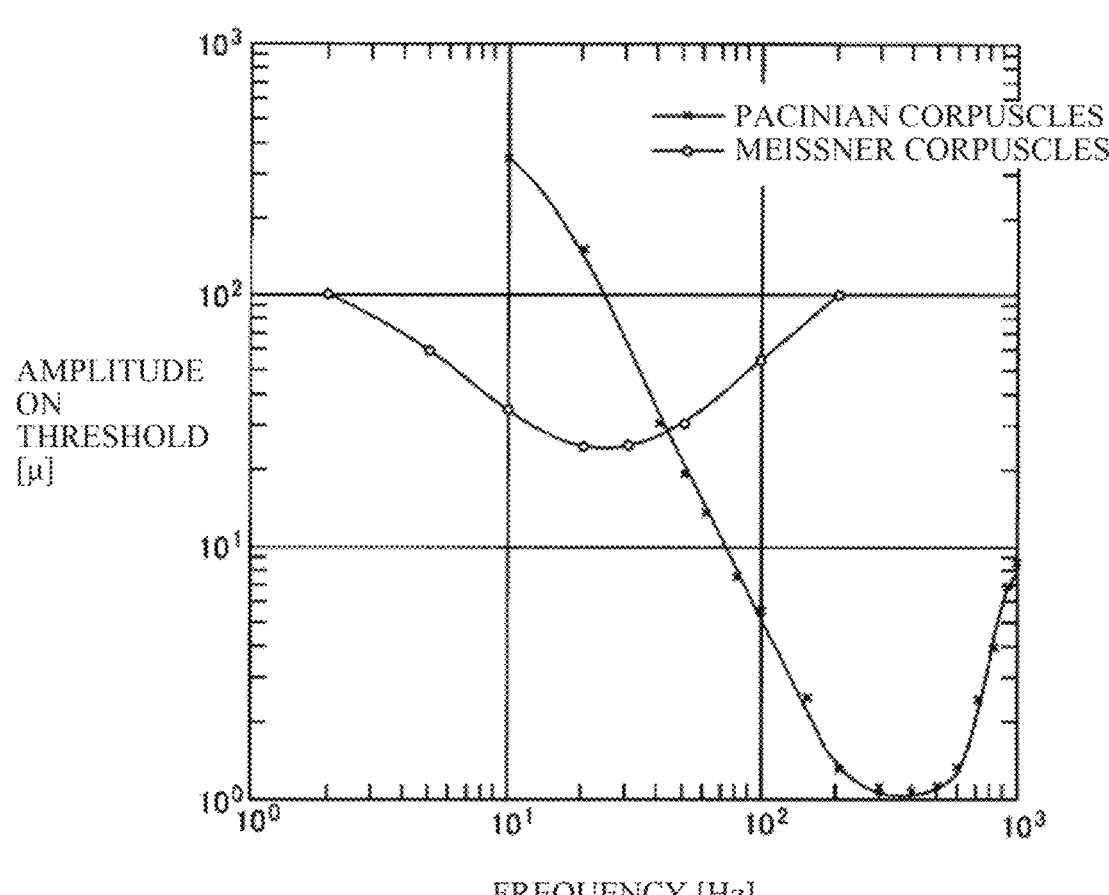

[FIG. 6]
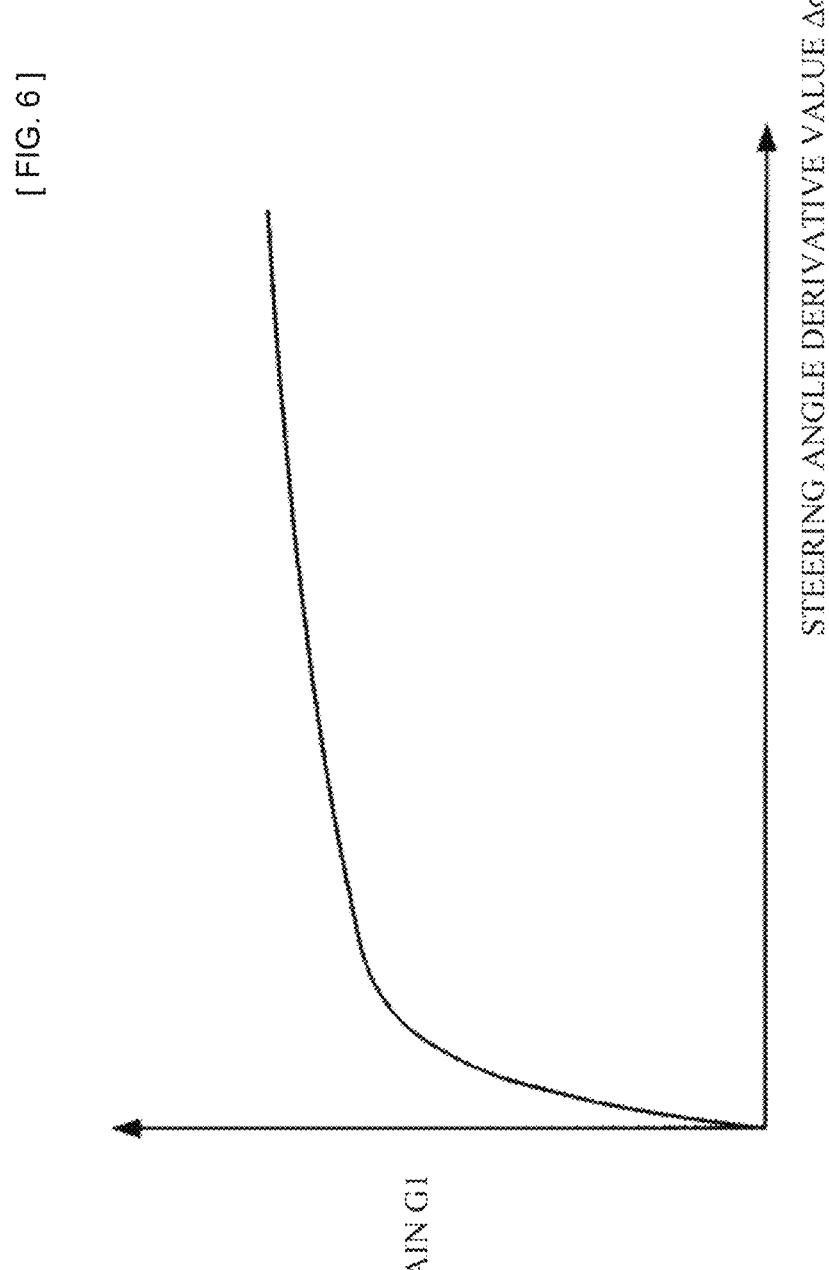
STEERING ANGLE DERIVATIVE VALUE Δσ
GAIN G1

[ FIG. 7 ]
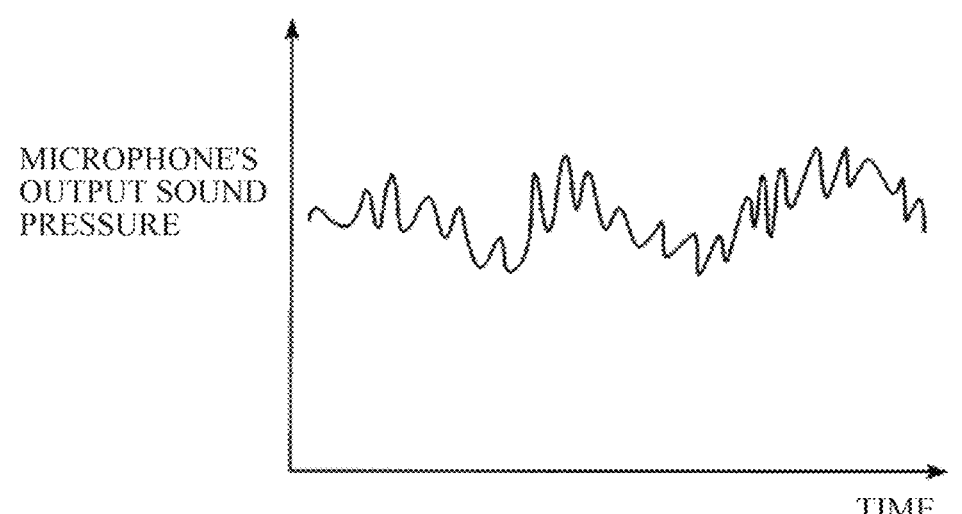
MICROPHONE'S
OUTPUT SOUND
PRESSURE
TIME
[ FIG. 8 ]
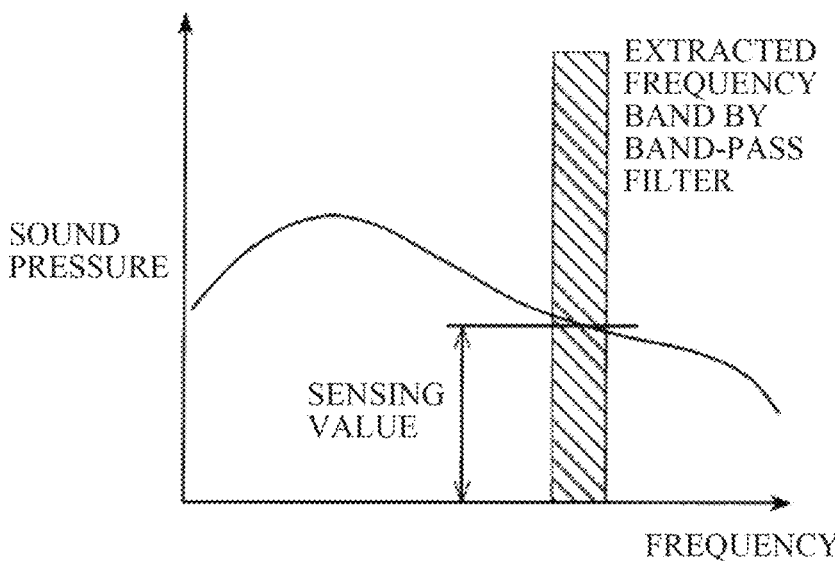
EXTRACTED
FREQUENCY
BAND BY
BAND-PASS
FILTER
SOUND
PRESSURE
SENSING
VALUE
FREQUENCY

[FIG. 9]
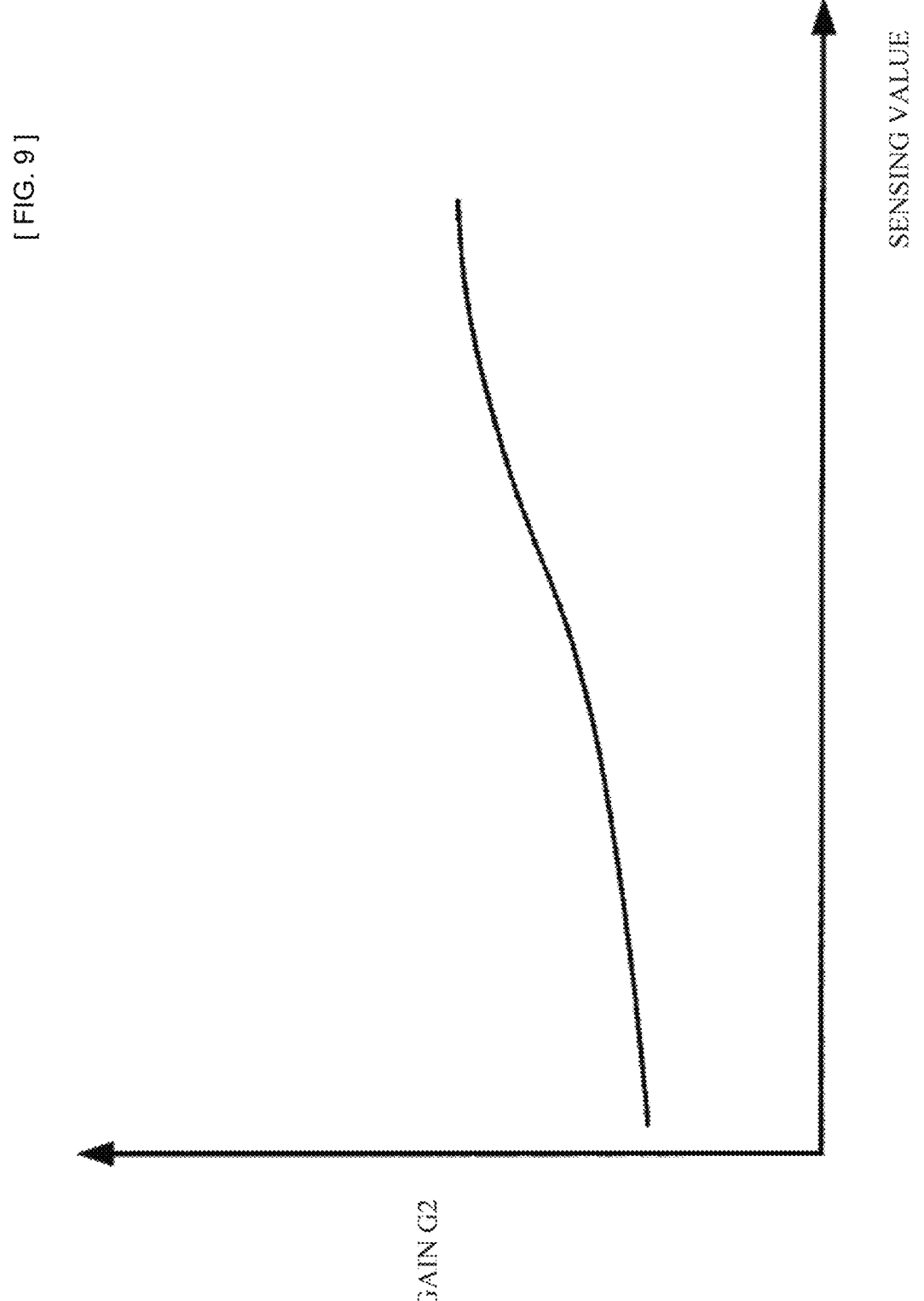

[ FIG. 10 ]
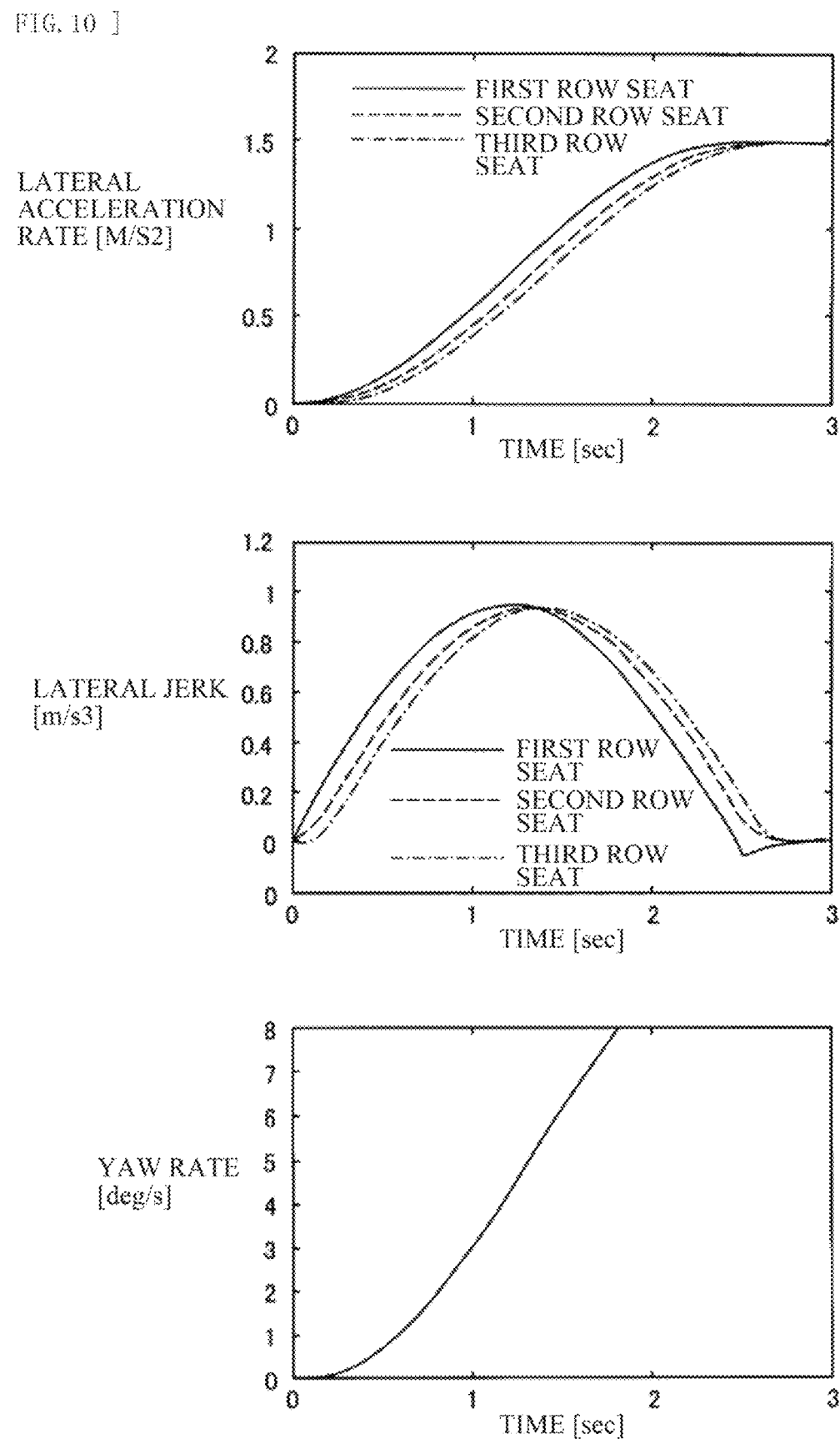

[ FIG. 11 ]

[ FIG. 12 ]
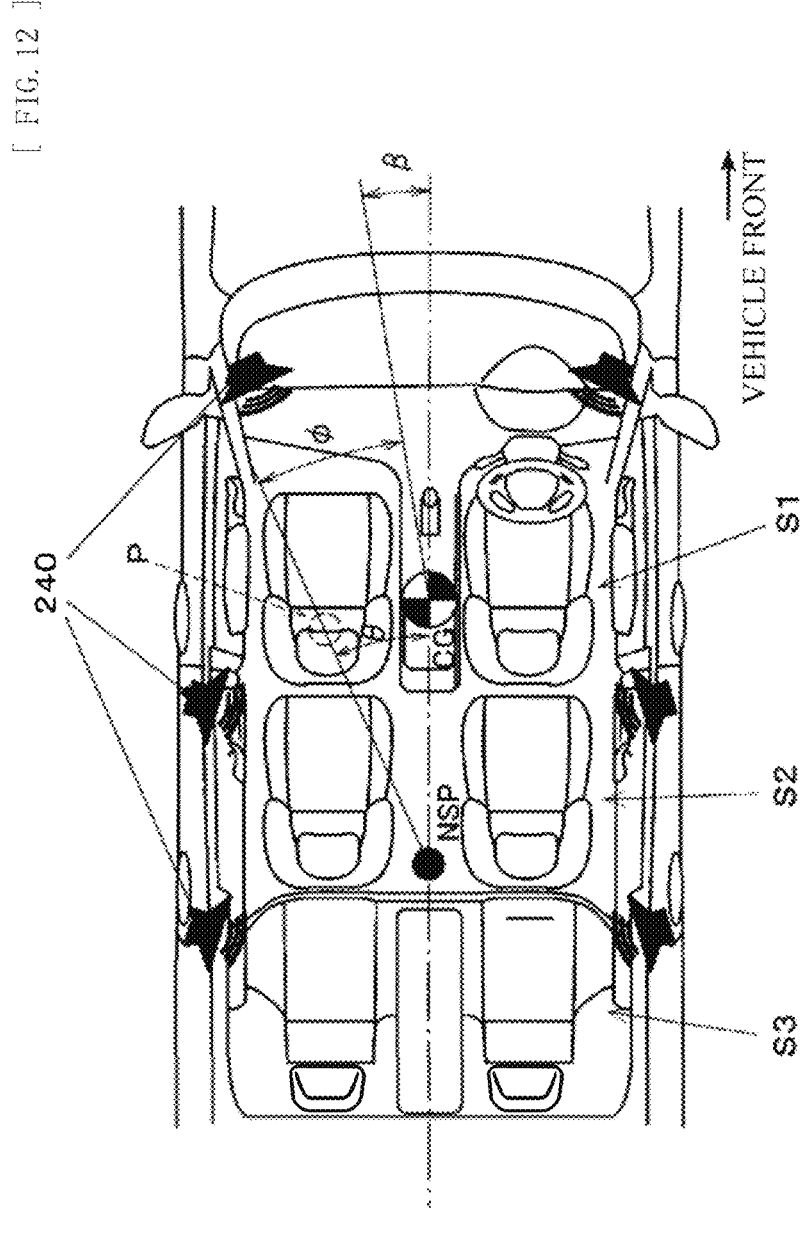

[ FIG. 13 ]
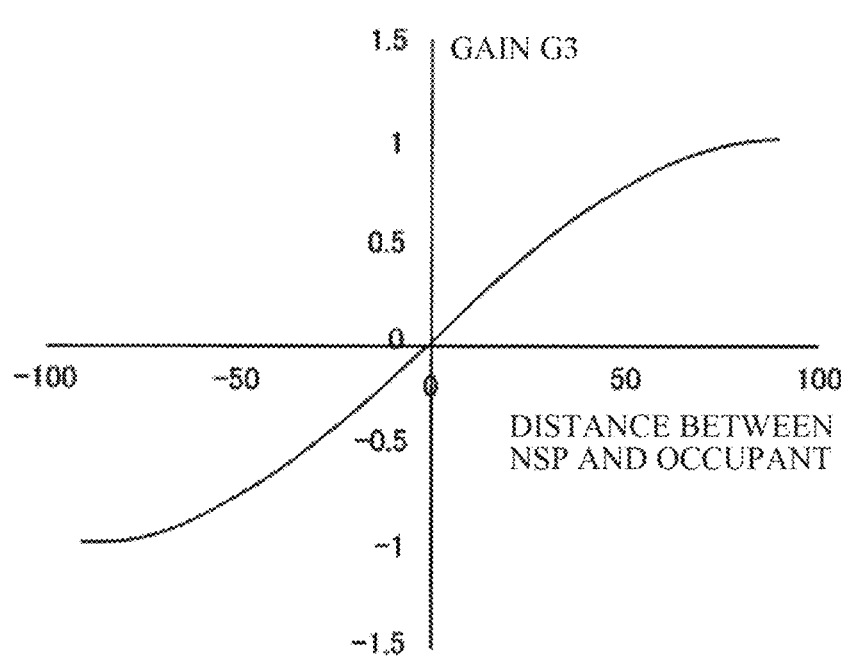

[ FIG. 14 ]
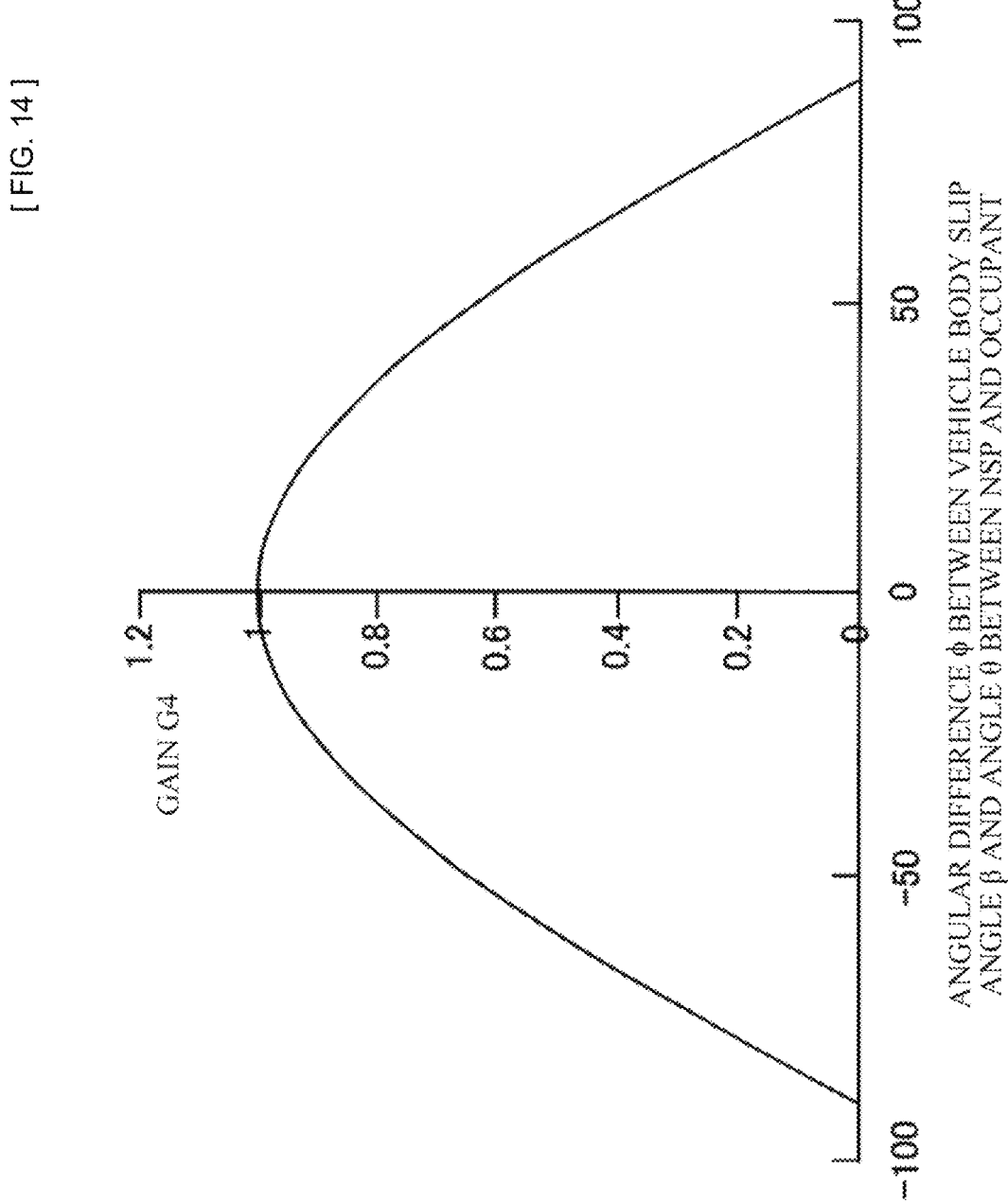

[ FIG. 15 ]
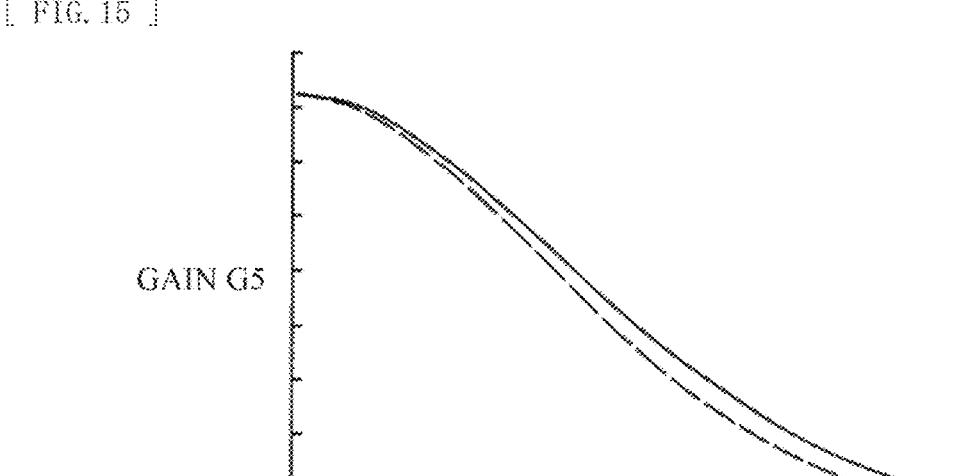
GAIN G5
VEHICLE SPEED [km/h]
[ FIG. 16 ]
CORNERING FORCE (CF) CHARACTERISTIC OF TIRE
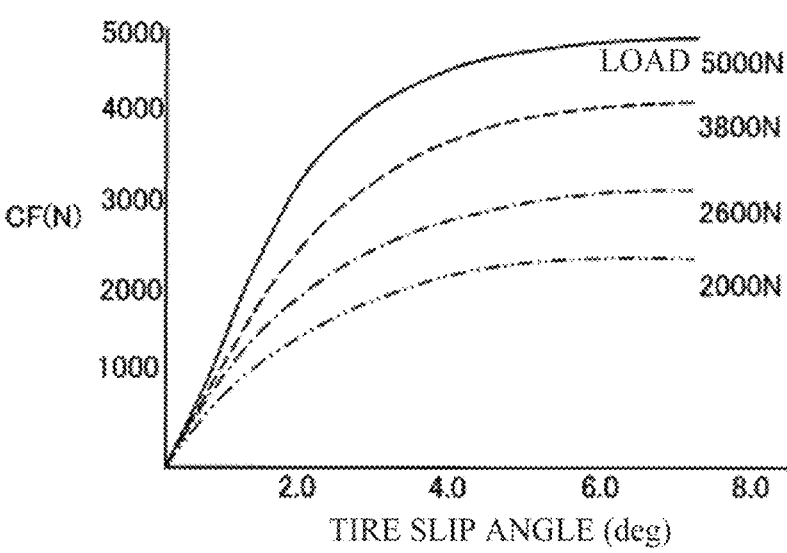
CF(N)
LOAD 5000N
3800N
2600N
2000N
TIRE SLIP ANGLE (deg)

[ FIG. 17 ]
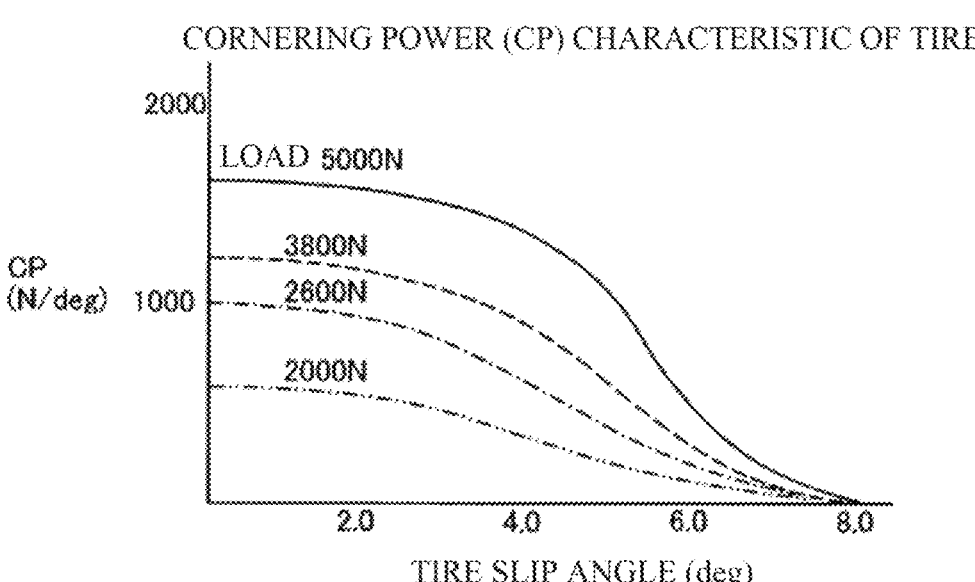
CORNERING POWER (CP) CHARACTERISTIC OF TIRE

[FIG. 18]

INFORMATION TRANSMISSION APPARATUS

CROSS-REFERENCE TO RELATED APPLICATIONS

This application is the U.S. National Phase under 35 U.S.C. § 371 of International Application No. PCT/JP2023/001328, filed on Jan. 18, 2023, the entire contents of which are hereby incorporated by reference.

TECHNICAL FIELD

The invention relates to an information transmission apparatus that transmits information on a behavior of a vehicle to an occupant of the vehicle.

BACKGROUND ART

A technique related to presenting information on a turning behavior of a vehicle, such as an automobile, to an occupant by sound includes, for example, a vehicle sound control apparatus disclosed in Patent Literature 1. The vehicle sound control apparatus includes speakers that are arranged to surround the occupant in a plan view and a controller that controls a sound field in a vehicle compartment by individually driving the speakers. The controller sets a reference yaw rate corresponding to a driving input when the driving input that changes a vehicle behavior is made, detects an actual yaw rate of the vehicle, rotates the sound field in the vehicle compartment in a direction in which the vehicle behavior actually changes, in accordance with a deviation of the actual yaw rate with respect to the reference yaw rate, and gives an effect as if a change in the turning behavior corresponding to the driving input has occurred before the turning behavior actually changes.

Patent Literature 2 discloses a vehicle sound effect generation apparatus that increases a sense of realism in a turning state of a vehicle by providing travel information to a driver via an auditory sense. The vehicle sound effect generation apparatus sets gains for integer-order components of an engine speed, based on an accelerator position, and generates sound effects, based on the gains that have been set and a storage of the integer-order components. In addition, when the vehicle is in a turning traveling state, the gain of a fourth component of the integer-order components is set to be larger than that in a normal traveling state.

Patent Document 3 discloses a vehicle seat device that accurately informs a seated person of a turning direction while keeping quietness in a vehicle compartment upon turning of a vehicle. The vehicle seat device includes a left speaker that outputs a sound from a left side of a headrest and a right speaker that outputs a sound from a right side of the headrest. In a case of a left turning, a sound is outputted from the left speaker, and in a case of a right turning, a sound is outputted from the right speaker.

CITATION LIST

Patent Literature

Patent Literature 1: International Publication No. WO 2014/174839

Patent Literature 2: Japanese Unexamined Patent Application Publication No. 2016-145884

Patent Literature 3: Japanese Unexamined Patent Application Publication No. 2022-119227

SUMMARY OF INVENTION

Problem to be Solved by the Invention

There is a time response delay from when steering of a vehicle is started until a behavior of a vehicle body actually occurs, resulting in an occurrence of, for example, a lateral acceleration rate, a yaw rate, and a roll angle. This may cause an occupant to feel that the lateral acceleration rate or the like has abruptly occurred depending on a situation of a steering operation, and to experience discomfort or anxiety due to, for example, being unable to properly hold the body of the occupant.

In contrast, for example, measures such as lowering a yaw rate gain with respect to a steering angle of the vehicle or increasing a holding performance of the seat or the like that holds the occupant may be considered.

However, when the yaw rate gain is lowered, the responsiveness of the vehicle becomes slow, and the performance and merchantability of the vehicle are impaired. In addition, it is difficult to appropriately deal with occupants having various body shapes by taking measures with the seats.

In contrast, being able to present information on the behavior of the vehicle to the occupant by acoustic information as in the above-described existing technique makes it possible to enhance predictability of the occupant on the behavior caused by the steering of the vehicle, and to reduce, for example, the feeling of abruptness.

However, there is a difference in a way of feeling a jerk (an acceleration rate of acceleration) that transiently occurs at, for example, an initial stage of turning of the vehicle depending on a seating position in the vehicle compartment, and there is a concern that an appropriate effect is not obtainable even if same information is transmitted to all occupants by sound.

In view of the above-described problems, it is an object of the invention to provide an information transmission apparatus that improves predictability on behavior caused by steering of a vehicle regardless of a seating position in a vehicle compartment.

Means for Solving the Problem

To solve the above-described problem, an aspect of the invention provides an information transmission apparatus configured to be provided on a vehicle that includes a steering device configured to steer a wheel. The information transmission apparatus includes a parameter detector, a vibrator, a rotation center calculator, and a gain adjuster. The parameter detector is configured to detect a parameter that correlates with a steering amount of the steering device. The vibrator is configured to vibrate air around an occupant based on a predetermined vibration waveform in accordance with a change in the parameter of the steering device. The rotation center calculator is configured to calculate a position of a rotation center of a yaw behavior of a body of the vehicle. The gain adjuster is configured to adjust an output gain of the vibration waveform in accordance with a relative position between the rotation center and a seating position of the occupant.

Effects of the Invention

As described above, the invention makes it possible to provide an information transmission apparatus that improves predictability on a behavior caused by steering of a vehicle regardless of a seating position in a vehicle compartment.

BRIEF DESCRIPTION OF DRAWINGS

FIG. 1 is a diagram schematically illustrating a configuration of an electric power steering apparatus of a vehicle that includes an information transmission apparatus according to a first embodiment of the invention.

FIG. 2 is a schematic diagram illustrating a system configuration of the information transmission apparatus according to the first embodiment.

FIG. 3 provides graphs schematically illustrating examples of a vibration waveform according to the first embodiment.

FIG. 4 is a diagram schematically illustrating timing of electric pulses emitted by receptors upon receiving stimulus.

FIG. 5 is a graph illustrating respective sensitivity distributions of Pacinian corpuscles and Meissner corpuscles with respect to a frequency.

FIG. 6 is a graph schematically illustrating an example of gain adjustment in a first gain adjuster according to the first embodiment.

FIG. 7 is a graph schematically illustrating an example of an output history of a microphone according to the first embodiment.

FIG. 8 is a graph illustrating an example of a correlation between a sound pressure of background noise and the frequency according to the first embodiment.

FIG. 9 is a graph schematically illustrating an example of gain adjustment in a second gain adjuster according to the first embodiment.

FIG. 10 provides graphs illustrating examples of, in a vehicle having three rows of seats, a lateral acceleration rate and a lateral jerk of each of the rows of seats and a yaw rate of a vehicle body, at a start of turning.

FIG. 11 is a diagram illustrating a resultant force caused by a vehicle body slip angle.

FIG. 12 is a diagram illustrating an example of a seat arrangement in a vehicle compartment of the vehicle according to the first embodiment.

FIG. 13 is a graph schematically illustrating an example of gain adjustment in a third gain adjuster according to the first embodiment.

FIG. 14 is a graph schematically illustrating an example of gain adjustment in a fourth gain adjuster.

FIG. 15 is a graph schematically illustrating an example of gain adjustment in a fifth gain adjuster.

FIG. 16 is a graph schematically illustrating an example of a cornering force characteristic of a tire in accordance with changes in a load.

FIG. 17 is a graph schematically illustrating an example of a cornering power characteristic of the tire in accordance with changes in the load.

FIG. 18 is a diagram schematically illustrating a configuration of an automated driving system of a vehicle provided with an information transmission apparatus according to a second embodiment.

MODES FOR CARRYING OUT THE INVENTION

First Embodiment

In the following, a description is given of an information transmission apparatus according to a first embodiment of the invention.

The information transmission apparatus of the first embodiment is adapted to be provided on, for example, a four-wheel vehicle (for example, an automobile such as a passenger car) that steers (turns) two front wheels.

The vehicle includes an electric power steering apparatus that provides steering assist force by an electric motor to a steering device that steers the front wheels.

FIG. 1 is a diagram schematically illustrating a configuration of the electric power steering apparatus of the vehicle according to the first embodiment.

An electric power steering apparatus 1 includes, for example, a steering wheel 10, a steering shaft 20, an intermediate shaft 21, a pinion shaft 22, a rack shaft 30, a rack housing 40, tie rods 50, housings 60, a steering angle sensor 71, a torque sensor 72, an actuator unit 80, and an electric power steering control unit (EPS control unit) 90.

The steering wheel 10 is, for example, an annular operation member that is rotated by a driver to input a steering operation.

The steering wheel 10 is disposed to oppose a driver's seat in a vehicle compartment of the vehicle.

The steering shaft 20 is a rotating shaft having one end part attached to the steering wheel 10 and is a rotating shaft that transmits a rotational motion of the steering wheel 10 to a rack-and-pinion mechanism. The rack-and-pinion mechanism converts the rotational motion into a translation motion in a vehicle width direction.

The intermediate shaft 21 and the pinion shaft 22 are sequentially coupled to an opposite end part of the steering shaft 20 from the steering wheel 10.

A universal joint (Cardan joint) 23 is provided between the steering shaft 20 and the intermediate shaft 21, and a universal joint (Cardan joint) 24 is provided between the intermediate shaft 21 and the pinion shaft 22. The universal joints (Cardan joints) 23 and 24 are configured to transmit rotation in a state where the shafts are bent.

The pinion shaft 22 has a distal end part including a pinion gear. The pinion gear is engaged with a rack gear 31 of the rack shaft 30 and drives the rack shaft 30.

The rack shaft 30 is a columnar member disposed with a longitudinal direction (an axial direction) of the rack shaft 30 oriented in the vehicle width direction.

The rack shaft 30 is supported in a manner that allows a translation motion of the rack shaft 30 in the vehicle width direction with respect to a vehicle body.

The rack shaft 30 includes the rack gear 31 at a part of the rack shaft 30. The rack gear 31 is engaged with the pinion gear of the pinion shaft 22.

In response to the rotation of the steering shaft 20, the rack gear 31 is driven by the pinion gear. This causes the rack shaft 30 to perform the translation motion (move straight) in the vehicle width direction.

The rack gear 31 is disposed to be offset to one of left and right sides (usually, a driver's seat side) in the vehicle width direction.

For example, when the vehicle is what is called a right-hand drive vehicle in which a right front seat is the driver's seat, the rack gear 31 is disposed to be offset to the right side from the middle in a neutral state.

The rack housing 40 is a substantially cylindrical member. The rack housing 40 contains the rack shaft 30 while supporting the rack shaft 30 to be relatively displaceable in the vehicle width direction.

The rack housing 40 has both end parts each having a rack boot 41.

The rack boots 41 are members that prevent entry of a foreign matter such as dust into the rack housing 40 while allowing relative displacement of the tie rods 50 with respect to the rack housing 40.

The rack boots 41 include, for example, a resin-based material such as an elastomer and is formed into a shape of a bellows tube having flexibility.

The tie rods 50 are axial interlocking members that couple end parts of the rack shaft 30 to respective knuckle arms 61 of the housings 60 and cause the housings 60 to pivot about respective kingpin axes in conjunction with the translation motion of the rack shaft 30.

Each of the tie rods 50 has an inner end part in the vehicle width direction. The inner end part of each of the tie rods 50 is pivotally coupled to the corresponding end part of the rack shaft 30 via a ball joint 51.

Each of the tie rods 50 has an outer end part in the vehicle width direction. The outer end part of each of the tie rods 50 is coupled to the knuckle arm 61 of the corresponding housing 60 via a ball joint 52.

The housings (knuckles) 60 are members containing respective hub bearings. The hub bearings rotatably support respective front wheels FW about an axle.

Each of the housings 60 includes the knuckle arm 61. The knuckle arm 61 protrudes forward or rearward with respect to the axle.

Each of the housings 60 is rotatably supported about the kingpin axis. The kingpin axis is a predetermined rotational center axis.

The kingpin axis is a virtual axis that couples a bearing center of a strut top mount and a center of a ball joint that couples a lower part of the housing 60 and a transverse link (a lower arm), in an example case where a front suspension of the vehicle is of a MacPherson strut type.

Each of the housings 60 is pushed and pulled in the vehicle width direction by the rack shaft 30 via the corresponding tie rod 50. This causes the housing 60 to pivot about the kingpin axis and turn the corresponding front wheel FW.

The steering angle sensor 71 is an angle encoder that detects a rotation angle position of the pinion shaft 22.

An output of the steering angle sensor 71 is transmitted to the electric power steering control unit 90.

The electric power steering control unit 90 is configured to calculate a steering angle (toe angle change involved in steering) σ of the front wheels FW based on the output of the steering angle sensor 71.

The torque sensor 72 is a sensor that detects a torque (mainly a force of a steering operation performed by the driver) acting on the pinion shaft 22.

The torque sensor 72 is provided on the pinion shaft 22 at a part closer to the intermediate shaft 21 than the actuator unit 80.

An output of the torque sensor 72 is transmitted to the electric power steering control unit 90.

The actuator unit 80 is a drive device that drives and rotates the pinion shaft 22 to perform a power assist upon manual driving or perform a steering operation upon automated driving.

The actuator unit 80 includes, for example, a motor 81 and a gear box 82.

The motor 81 is an electric actuator that generates a driving force to be applied to the steering shaft 20.

A rotation direction and an output torque of the motor 81 are controlled by the electric power steering control unit 90.

The gearbox 82 includes a reduction gear train that decelerates a rotational output (or amplifies a torque) of the motor 81 and transmits the decelerated rotational output to the pinion shaft 22.

The electric power steering (EPS) control unit 90 is a control device (motor control unit) that applies, to the motor 81, a current instruction value that controls the rotation direction and the output torque.

The electric power steering control unit 90 may be configured as a microcomputer including, for example, an information processor such as a CPU, a storage such as a RAM or a ROM, an input/output interface, and a bus that couples these components to each other.

The electric power steering control unit 90 is configured to acquire information including, for example, outputs of the steering angle sensor 71 and the torque sensor 72, a traveling speed (a vehicle speed) of the vehicle, and an operating state of other pieces of in-vehicle electronic equipment directly or via an in-vehicle LAN such as a CAN communication system.

The electric power steering control unit 90 sets the current instruction value to be applied to the motor 81, based on a torque input direction and a detected torque value of the torque sensor 72 upon manual driving of the vehicle.

The electric power steering control unit 90 includes a power supply device that supplies an electric power having a current value and a voltage value that correspond to the current instruction value to the motor 81 via a signal line.

FIG. 2 is a schematic diagram illustrating a system configuration of an information transmission apparatus according to the first embodiment.

An information transmission apparatus 100 vibrates air around an ear part of an occupant by a speaker 240 disposed in a vehicle compartment, and notifies the occupant of a sign of an occurrence of a vehicle behavior by a sound signal.

The information transmission apparatus 100 includes, for example, a waveform generator 110, a differential calculator 120, a first gain adjuster 130, a microphone 140, a sensing value calculator 150, a second gain adjuster 160, a neutral steer point calculator 170, a yaw rate sensor 180, a vehicle speed sensor 190, a third gain adjuster 200, a fourth gain adjuster 210, a fifth gain adjuster 220, a load sensor 230, and the speaker 240.

The waveform generator 110 generates a vibration waveform that is a waveform of the sound signal generated by the speaker 240.

FIG. 3 provides graphs schematically illustrating examples of the vibration waveform according to the first embodiment.

In FIG. 3, horizontal axes represent time, and vertical axes represent a voltage (amplitude). For example, as illustrated in FIG. 3(*a*), the vibration waveform may be a sine wave.

Further, for example, as illustrated in FIG. 3(*b*), the vibration waveform may be a waveform in which multiple sine waves having different wavelengths are superimposed (combined).

Further, the vibration waveform is not limited to these waveforms, and may be changed as appropriate.

For example, as the vibration waveform, various waveforms such as a rectangular wave, a triangular wave, and a waveform simulating a traveling sound of the vehicle may be used alone or in combination with other waveforms.

In the first embodiment, it is possible to set the frequency of the vibration waveform to have a dominant frequency in a range of, for example, 100 to 400 Hz, or more preferably in a range of 150 to 300 Hz.

Reasons for this will hereafter be described.

Sensory receptors that sense vibrations when the air around the occupant is vibrated include, for example, Merkel cells, Meissner corpuscles, and Pacinian corpuscles.

FIG. 4 is a diagram schematically illustrating timing of electric pulses emitted by receptors upon receiving stimulus.

In FIG. 4, horizontal axes represent time, and vertical axes represent, in order from the top, a pressure, an electric pulse generation state of Merkel cells, an electric pulse generation state of Meissner corpuscles, and an electric pulse generation state of Pacinian corpuscles.

Merkel cells are relatively slow in response and respond to a DC component.

The Meissner corpuscles respond when a rate of change (speed) of a contact pressure is occurring.

The Pacinian corpuscles respond to a transient variation moment. The Pacinian corpuscles are considered as the most sensitive of these receptors.

It is considered that the sensitivity of the Pacinian corpuscles is the most favorable as the receptors that allow the occupant to sense a minute vibration as composite information of an auditory sense and a tactile sense.

FIG. 5 is a graph illustrating respective sensitivity distributions of the Pacinian corpuscles and the Meissner corpuscles with respect to a frequency.

In FIG. 5, a horizontal axis represents the frequency, and a vertical axis represents an amplitude on a threshold, and the smaller value represents higher sensitivity.

As illustrated in FIG. 5, the Pacinian corpuscles have favorable sensitivity in a region around 100 to 400 Hz, and in particular, the Pacinian corpuscles have further favorable sensitivity in 150 to 300 Hz.

Such regions are included in a range of 20 Hz to 20 kHz that is generally referred to as a human audible range.

The dominant frequency of the vibration waveform may be set to 250 Hz as an example.

The differential calculator 120 acquires information on a steering angle σ of the front wheels FW detected by the steering angle sensor 71 from the electric power steering control unit 90, and calculates a derivative value Δσ differentiated by time.

The differential calculator 120 successively transmits the calculated derivative value Δσ to the first gain adjuster 130.

The first gain adjuster 130 performs first gain adjustment to be described below on a fundamental wave of the vibration waveform generated by the waveform generator 110.

The first gain adjustment changes a gain G1 that is an output gain by which a voltage of the vibration waveform is to be multiplied, in accordance with the derivative value (rate of change per hour) of the steering angle σ (a parameter that correlates with a steering amount) of the steering device.

FIG. 6 is a diagram schematically illustrating an example of gain adjustment in the first gain adjuster.

In FIG. 6, a horizontal axis represents an absolute value of the derivative value Δσ of the steering angle σ of the wheels FW, and a vertical axis represents the gain G1 by which the voltage of the vibration waveform is to be multiplied.

The gain G1 may be configured to increase as the absolute value of the derivative value Δσ increases.

In addition, an increase rate of the gain G1 with respect to the increase in the absolute value of the derivative value Δσ in the first gain adjuster 130 may be configured to be maximized in a region where the absolute value of the derivative value Δσ is minute, and to be decreased in accordance with the increase in the absolute value of the derivative value Δσ.

It is possible to calculate the gain G1 of the first gain adjuster 130 from, for example, the absolute value of the derivative value Δσ of the steering angle σ by a logarithmic function.

The gain G1 is represented by, for example, Expression 1 below.

$$\text{Gain } G1 = \log \qquad \qquad \text{(Expression 1)}$$
$$(\text{absolute value of steering angle derivative value } \Delta\sigma \times$$
$$\text{coefficient } k)$$

The coefficient k may be a value that is set, for example, at a development stage of the vehicle in accordance with a characteristic (for example, a yaw gain with respect to the steering angle σ and a position of a center of gravity) of the vehicle.

The microphone 140 is a sound collection device that is provided in the vehicle compartment and collects background noise in the vehicle compartment.

The microphone 140 is preferably disposed at a position close to an ear of the occupant, and may be provided in, for example, a headrest part of a seat.

An output of the microphone 140 is transmitted to the sensing value calculator 150.

The sensing value calculator 150 extracts a component in a predetermined frequency band from the background noise, of the vehicle, acquired by the microphone 140, and transmits a sound pressure of the extracted component to the second gain adjuster 160 as a sensing value.

FIG. 7 is a graph schematically illustrating an example of an output history of the microphone.

In FIG. 7, a horizontal axis represents time, and a vertical axis represents the sound pressure of the background noise acquired by the microphone 140.

The sensing value calculator 150 performs a fast Fourier transform (FFT) process on the sound signal of the background noise acquired by the microphone 140 to convert the sound signal into a frequency domain, and further performs a band-pass filter process to extract a component in a predetermined frequency band.

The frequency band to be extracted is set to include the dominant frequency of the vibration waveform outputted from the waveform generator 110.

The sensing value calculator 150 sets an average sound pressure of the extracted frequency band as the sensing value to be used for second gain adjustment.

FIG. 8 is a graph illustrating an example of a correlation between the sound pressure of the background noise and the frequency.

In FIG. 8, a horizontal axis represents the frequency, and a vertical axis represents the sound pressure.

The band-pass filter may be configured to extract, for example, the frequency band around the dominant frequency (for example, 250 Hz) of the vibration waveform of the waveform generator 110.

The sound pressure in the extracted frequency band (an average value of the frequency band as an example) is provided to the second gain adjuster 160 as the sensing value.

The second gain adjuster 160 further performs the second gain adjustment to be described below, on the vibration waveform that has been subjected to the first gain adjustment.

The second gain adjustment changes the gain of the vibration waveform in accordance with the sensing value of the noise in the vehicle compartment to adjust an output amplitude of the vibration waveform in accordance with a change in the background noise (drive system noise, aerodynamic noise, road noise, etc.) during traveling of the vehicle.

The second gain adjuster 160 performs the second gain adjustment based on the output of the sensing value calculator 150.

The second gain adjuster 160 sets the gain G2 based on the sensing value outputted by the sensing value calculator 150.

FIG. 9 is a graph schematically illustrating an example of gain adjustment in the second gain adjuster.

In FIG. 9, a horizontal axis represents the sensing value, and a vertical axis represents the gain G2 by which the voltage of the vibration waveform is to be multiplied.

The gain G2 may be configured to increase as the sensing value increases.

The gain G2 is so set that the sound pressure of a sound caused by the vibration amplitude outputted from the speaker 240 does not become dominant to the sound pressure of the background noise at the ear of the occupant.

Preferably, the gain G2 may be so set that the sound caused by the vibration amplitude is submerged in the background noise of the vehicle and has a sound pressure level that is unconsciously audible by the occupant.

Further, in a state in which the steering angle σ of the steering device is not caused, the sound pressure of the sound caused by the vibration amplitude outputted from the speaker 240 is set to a standby state in which the sound pressure is sufficiently lower than that of the background noise of the vehicle.

The output value (voltage) A of the vibration waveform after the first gain adjustment and the second gain adjustment described above is represented by Expression 2.

$$
\begin{aligned}
\text{Output value } A = &\quad \text{(Expression 2)} \\
\text{output value of waveform generator} &\times \text{gain } G1 \times \text{gain } G2 = \\
\text{output value of waveform generator} &\times \log \\
(\text{absolute value of steering angle derivative value } \Delta\sigma &\times \\
\text{coefficient } k) &\times \text{gain } G2
\end{aligned}
$$

A part of the output of the second gain adjuster 160 is directly transmitted to the speaker 240 as a basic term.

The other part of the output of the second gain adjuster 160 is transmitted to the speaker 240 as a correction term after additional gain adjustment described below is performed.

Here, the correction term reflects an influence of a lateral acceleration rate and a jerk acting on the occupant due to a yaw angular velocity and a yaw angular acceleration rate of the vehicle.

FIG. 10 provides graphs illustrating examples of, in a vehicle having three rows of seats, the lateral acceleration rate and a lateral jerk of each of the rows of seats and the yaw rate of the vehicle body, at a start of turning.

In order from the top graph, vertical axes represent the lateral acceleration rate, the lateral jerk (acceleration rate of the lateral acceleration rate), and the yaw rate, and horizontal axes represent time.

In the vehicle having three rows of seats arranged sequentially from the vehicle front side, it is found that timing of detecting the lateral acceleration rate and the lateral jerk and magnitudes of the lateral acceleration rate and the lateral jerk differ in the rear row seat from those in the front row seat even in the same vehicle.

Such a phenomenon is considered to be caused by a difference in relative positions between a neutral steer point and respective seating positions. The neutral steer point is a rotation center of the yaw behavior of the vehicle body.

Accordingly, in the present embodiment, the position of a neutral steer point NSP of the vehicle is calculated, and the output gain of the vibration waveform is corrected as follows in accordance with the relative positions between the neutral steer point NSP and the respective seating positions.

The neutral steer point calculator 170 calculates the position of the neutral steer point NSP from, for example, information on the steering angle σ transmitted from the electric power steering control unit 90, the output of the yaw rate sensor 180, and the output of the vehicle speed sensor 190.

The yaw rate sensor 180 is a sensor that detects a yaw rate γ. The yaw rate γ is a rotational speed of the vehicle in a yaw direction.

The vehicle speed sensor 190 is, for example, a sensor that is provided at a hub part that supports a wheel and outputs a vehicle speed signal corresponding to the rotational speed of the wheel.

It is possible to calculate the vehicle speed V from the vehicle speed signal.

Figure 11:
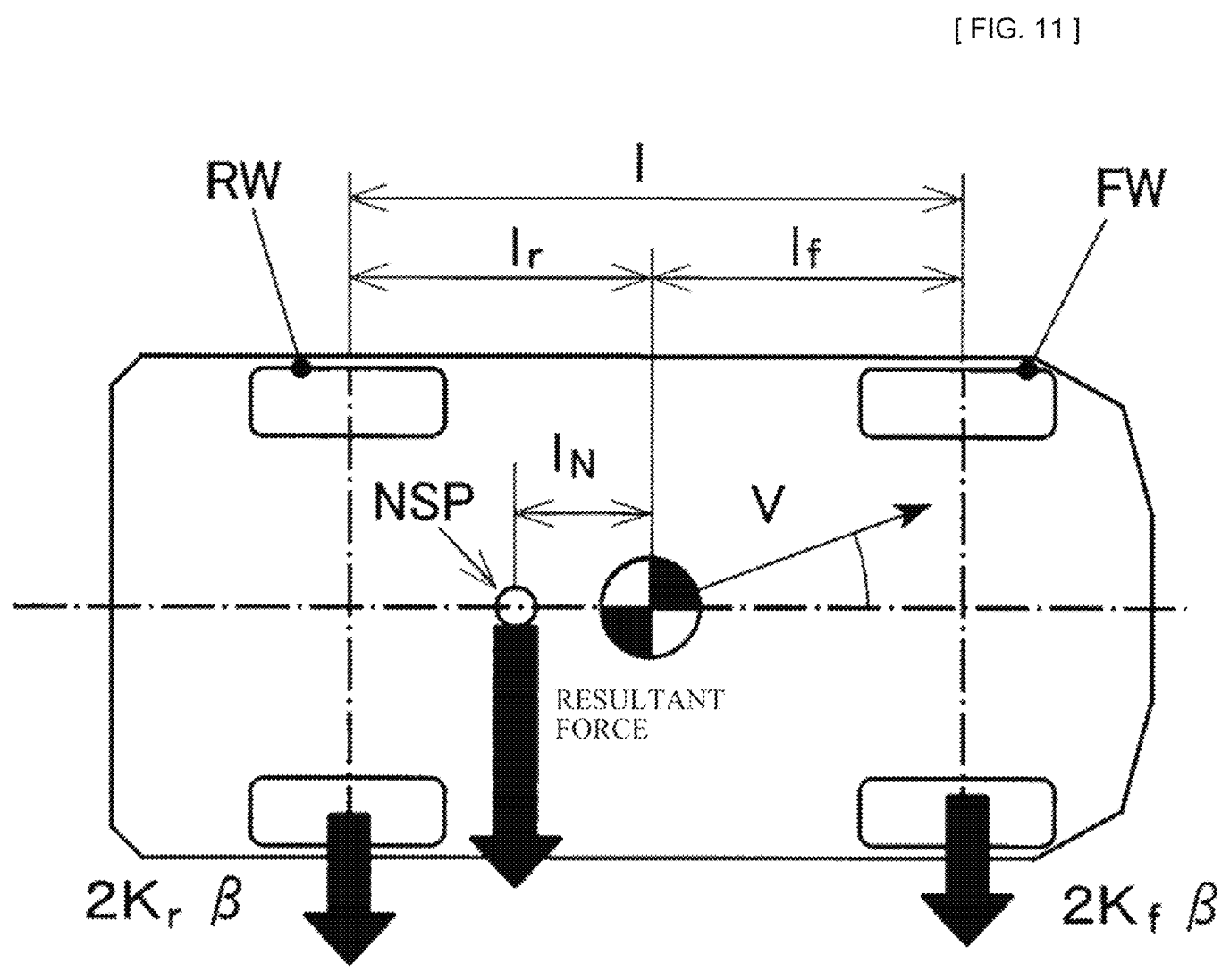

FIG. 11 is a diagram illustrating a resultant force caused by a vehicle body slip angle.

As illustrated in FIG. 11, when a slip angle β occurs in the vehicle body, the front wheels FW and rear wheels RW respectively generate lateral forces (cornering forces) corresponding to the slip angle β and stiffnesses (cornering powers) Kf and Kr.

The neutral steer point NSP is a point at which a yaw moment of the vehicle caused by the cornering force generated by the front wheels FW and the rear wheels RW is balanced.

Expression 3 is satisfied.

[Mathematical Expression 1]

$$(l_f + l_r)\cdot 2K_f\beta - (l_r - l_N)\cdot 2K_r\beta = 0 \qquad \text{(Expression 3)}$$

where

1: Wheel base $l_f$: Distance between center of gravity of vehicle body and front axle $l_r$: Distance between center of gravity of vehicle body and rear axle $l_N$: Distance between center of gravity of vehicle body and neutral steer point β: Vehicle body slip angle $K_f$: Stiffness of front wheel FW (cornering power Cp)

$K_r$: Stiffness of rear wheel RW (cornering power Cp)

Based on Expression 3, Expression 4 below is obtained.

[Mathematical Expression 2]

$$l_N = -\frac{l_f K_f - l_r K_r}{K_f + K_r} \qquad \text{(Expression 4)}$$

Expressions 5 to 7 below are satisfied.

[Mathematical Expression 3]

$$\gamma = \frac{1}{1 + AV^2} \frac{V}{l} \sigma \qquad \text{(Expression 5)}$$

$$A = \frac{\sigma}{\gamma} \frac{1}{Vl} - \frac{1}{V^2} \qquad \text{(Expression 6)}$$

$$l_N = A \frac{2l^2}{m} \frac{K_f K_r}{K_f + K_r} \qquad \text{(Expression 7)}$$

where

γ: yaw rate

A: stability factor

σ: actual steering angle (steering amount)

V: vehicle speed m: vehicle mass

FIG. 12 is a diagram illustrating an example of a seat arrangement in the vehicle compartment of the vehicle according to the first embodiment.

The vehicle includes, for example, a first row seat S1, a second row seat S2, and a third row seat S3 arranged in a front-rear direction. Each of the rows of seats includes multiple (for example, a pair of) seating positions arranged in the vehicle width direction.

In the example illustrated in FIG. 12, a center of gravity CG of the vehicle is located, for example, adjacent to a position between the left and right seating positions (between the driver's seat and a front passenger's seat) of the first row seat S1.

The neutral steer point NSP is located rearward of the center of gravity CG and forward of a position of an axle of the rear wheels RW.

The position of the neutral steer point NSP in the front-rear direction varies depending on, for example, the vehicle speed and also varies from a transient state (at the start of turning) to a constant state even at the same vehicle speed.

[Mathematical Expression 4]

$$\dot{\gamma}$$

: yaw angular acceleration rate $l_p$: distance between neutral steer point NSP and occupant α: acceleration rate component applied to occupant by yaw angular acceleration rate Based on above definition, Expression 8 below is satisfied.

[Mathematical Expression 5]

$$\alpha = l_p * \sin\dot{\gamma} \qquad \text{(Expression 8)}$$

When a relative angle between an angle θ (refer to FIG. 12) from the neutral steer point NSP to the seat (occupant and the vehicle body slip angle β is denoted as φ, Expression 9 below is satisfied.

[Mathematical Expression 6]

$$\alpha_y = \alpha * \cos\varphi \qquad \text{(Expression 9)}$$

The third gain adjuster 200, the fourth gain adjuster 210, and the fifth gain adjuster 220 sequentially adjust the output gain on the correction term of the vibration waveform outputted from the second gain adjuster 160.

The third gain adjuster 200 performs adjustment (a third gain adjustment) of the output gain in accordance with the distance between the neutral steer point NSP calculated by the neutral steer point calculator 170 and the seating position of the occupant (in particular, the position of a head part (an ear part)).

FIG. 13 is a graph schematically illustrating an example of the gain adjustment in the third gain adjuster.

In FIG. 13, a horizontal axis represents the distance between the neutral steer point NSP and the seating position of the occupant, and a vertical axis represents the gain G3 by which the voltage of the vibration waveform (the correction term) is to be multiplied.

The absolute value of the gain G3 increases as the absolute value of the distance increases.

Further, when the distance is negative (when the occupant is seated rearward of the neutral steer point NSP), the gain G3 is negative.

In this case, the acceleration rate and the jerk to be received by the occupant due to the yaw behavior of the vehicle body act to cancel the acceleration rate and the jerk to be received by the occupant due to centripetal acceleration as the vehicle turns. That is, the acceleration rate and the jerk to be felt by the occupant are reduced.

When the distance between the neutral steer point NSP and the seating position of the occupant is zero (both at the same position), the gain G3 becomes zero and the correction term disappears.

The fourth gain adjuster 210 performs adjustment (a fourth gain adjustment) of the output gain in accordance with an angular difference φ (refer to FIG. 12) between the slip angle β of the vehicle body and the angle θ defined by a straight line that couples the neutral steer point NSP and the seating position of the occupant with respect to a center line of the vehicle body.

FIG. 12 illustrates a state in which an occupant P is seated, for example, on the left side (the front passenger's seat) of the first row seat S1.

A graph schematically illustrating an example of the gain adjustment in the fourth gain adjuster.

FIG. 14 is a graph schematically illustrating an example of the gain adjustment in the fourth gain adjuster.

In FIG. 14, a horizontal axis represents the angular difference φ, and a vertical axis represents a gain G4 by which the voltage of the vibration waveform (the correction term) is to be multiplied.

The gain G4 is the largest when the angular difference φ is equal to 0, and thereafter decreases as the absolute value of the angular difference φ increases.

When the angular difference φ reaches ±90°, the gain G4 becomes zero.

The fifth gain adjuster 220 performs adjustment (a fifth gain adjustment) of the output gain in accordance with the vehicle speed of the vehicle and.

The fifth gain adjuster 220 adjusts the output gain based on the outputs of the vehicle speed sensor 190 and the load sensor 230.

The load sensor 230 includes, for example, a stroke sensor that detects a stroke of a suspension device (typically, a rear suspension).

Based on an output of the load sensor 230, the fifth gain adjuster 220 is configured to determine a load state of the vehicle including, for example, the number of occupants and a loading condition of cargo.

FIG. 15 is a graph schematically illustrating an example of the gain adjustment in the fifth gain adjuster.

In FIG. 15, a horizontal axis represents the vehicle speed, and a vertical axis represents a gain G5 by which the voltage of the vibration waveform (the correction term) is to be multiplied.

The gain G5 is set to decrease as the vehicle speed increases.

Further, the gain G5 is provided with multiple maps (diagrams) depending on the load state of the vehicle.

FIG. 16 is a graph schematically illustrating an example of a cornering force characteristic of a tire in accordance with changes in a load.

In FIG. 16, a horizontal axis represents the sliding angle of the tire, and a vertical axis represents a cornering force CF.

FIG. 17 is a graph schematically illustrating an example of a cornering power characteristic of a tire in accordance with changes in the load.

In FIG. 17, a horizontal axis represents the sliding angle of the tire, and a vertical axis represents a cornering power CP.

As illustrated in FIGS. 16 and 17, the characteristics of the tire differ depending on the load. The map (diagram) of the gain G5 as illustrated in FIG. 15 is appropriately switched in accordance with the loading state, of the vehicle, detected by the load sensor 230.

The speaker 240 is a vibration device that is disposed in the vehicle compartment and vibrates the air around the occupant in the vehicle compartment to generate a sound based on an output value A of the vibration waveform that has been subjected to the first to fifth gain adjustments described above.

The speaker 240 may also be used as, for example, a speaker used for audio reproduction or the like of an in-vehicle audio system.

Further, the speaker 240 dedicated to the information transmission apparatus 100 may be provided.

As illustrated in FIG. 12, when the first row seat to the third row seat each have left and right seating positions, at least six speakers 240 may be provided corresponding to respective seating positions.

Each of the speakers 240 may be a directional speaker that is directed toward a position around the head part (the ear part) of an occupant seated in the corresponding seating position.

Each of the speakers 240 may be provided, for example, inside a vehicle compartment interior member such as an instrument panel, a door trim, or a pillar trim, or on a headrest, a backrest, or the like of the seat disposed immediately in front of each occupant.

Here, out of the above-described gain adjustments, the third and fourth gain adjustments are independently performed for each speaker 240 in accordance with the seating position of the occupant to which each speaker 240 is directed.

That is, the amplitude of the vibration waveform of each speaker 240 differs depending on the seating position of the corresponding occupant.

According to the first embodiment described above, the following effects are obtainable.

(1) A sound is generated in which the sound pressure increases in accordance with the increase in the absolute value of the derivative value (what is called a steering speed) of the steering angle σ of the steering device. This makes it possible for the occupant P to predict an occurrence of a behavior by the sound at an initial stage of the steering before an actual occurrence of, for example, the lateral acceleration rate, the yaw rate, and the roll angle on the vehicle.

This makes it possible to improve the predictability of the occupant P on the vehicle behavior, and to prevent the occupant P from feeling that the behavior of the vehicle is abrupt.

Further, the output gain of the vibration waveform is adjusted in accordance with the relative position between the neutral steer point NSP, which is the rotation center of the yaw behavior, and the seating position of the occupant P. This enables to transmit information that appropriately reflects the influence of the lateral acceleration rate and the jerk that the occupant P is to receive due to the yaw behavior of the vehicle. This makes it possible to reduce deviation between sound information transmitted to the occupant P by the corresponding speaker 240 and the lateral acceleration rate and the like that the occupant is to actually receive, and to improve the predictability on the behavior caused by the steering of the vehicle regardless of the seating position in the vehicle compartment.

In particular, in the seat that is in the second or further back row where there is little visual information and an occupant easily feel a sense of abruptness on the behavior of the vehicle compared with the first row seat S1, it is possible to improve the predictability on the vehicle behavior, thus reducing the sense of abruptness, and to prevent, for example, a car sickness.

(2) The third gain adjuster 200 changes the output gain in accordance with the change in the distance between the neutral steer point NSP and the seating position. This makes it possible to reflect the fact that the acceleration rate and the jerk to be received by the occupant P varies in accordance with the increase in the distance between the neutral steer point NSP and the seating position, and to transmit appropriate information to the occupant P.

(3) The fourth gain adjuster 210 reduces the output gain in accordance with an increase in the angular difference φ between the slip angle β of the vehicle body and the angle θ defined by the straight line that couples the neutral steer point NSP and the seating position with respect to the center line of the vehicle body in a plan view. This makes it possible to appropriately estimate lateral components of the acceleration rate and the jerk to be received by the occupant P due to the change in the yaw angular acceleration rate on the vehicle body, and to transmit appropriate information to the occupant P.

(4) The multiple seating positions are provided, and the multiple speakers 240 are provided corresponding to the seating positions. The amplitudes of the respective vibration waveforms outputted from the speakers 240 are made different from each other in accordance with the relative positions between the neutral steer point NSP and the seating positions. This makes it possible to transmit appropriate information corresponding to the seating position to each of the occupants P seated in respective seating positions.

(5) The vibration waveform has the dominant frequency included in the frequency band of 100 to 400 Hz. This makes it possible to use, for example, the Pacinian corpuscles that are highly sensitive in the audible range and skin sensation, allowing the occupant P to more favorably sense a sound from a sound device and perceive skin sensation. This makes it possible to more reliably transmit the information to the occupant P.

Second Embodiment

Next, a description is given of an information transmission apparatus according to a second embodiment of the invention.

In the second embodiment, the vehicle includes an automated driving function that performs, for example, a steering operation, an acceleration operation, and a deceleration operation autonomously without depending on a driving operation of the driver.

Figure 18:
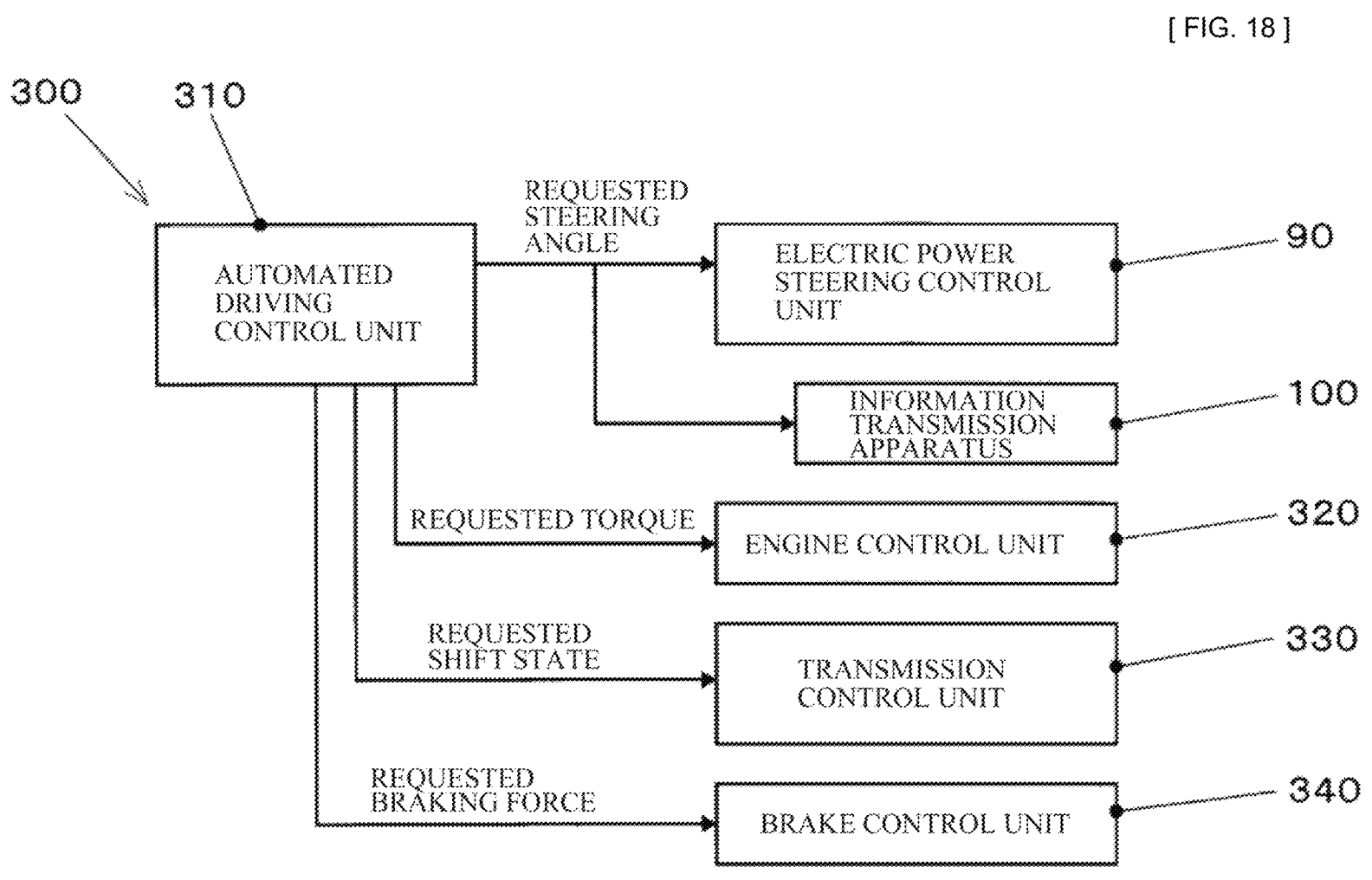

FIG. 18 is a diagram schematically illustrating a configuration of an automated driving system of a vehicle provided with the information transmission apparatus according to the second embodiment.

An automated driving system 300 further includes, for example, an automated driving control unit 310, an engine control unit 320, a transmission control unit 330, a brake control unit 340 in addition to the electric power steering control unit 90 described above.

Each of these units includes a microcomputer including, for example, an information processor such as a CPU, a storage such as a RAM or a ROM, an input/output interface, and a bus that couples these components to each other.

The units are coupled to each other directly or, for example, via an in-vehicle LAN such as a CAN communication system, and are configured to communicate with each other.

The automated driving control unit 310 recognizes an environment around the own vehicle using, for example, various sensors such as a stereo camera device, a millimeter-wave radar device, or a laser scanner device, and a high-precision 3D map.

The automated driving control unit 310 generates, based on the recognized environment, an automated driving scenario including information on, for example, a driving line and a speed of the own vehicle.

The automated driving control unit 310 provides, based on the automated driving scenario, instructions to the electric power steering control unit 90, the engine control unit 320, the transmission control unit 330, and the brake control unit 340 to control steering, acceleration, and deceleration of the vehicle.

The electric power steering control unit 90 controls the actuator unit 80 in accordance with a requested steering angle instructed by the automated driving control unit 310 instead of the steering input from the driver as in the first embodiment, and performs steering of the front wheels FW.

The engine control unit 320 comprehensively controls an engine serving as a travel power source of the vehicle and auxiliary devices of the engine.

The engine control unit 320 controls the output of the engine to make the torque actually generated by the engine to be equal to the requested torque instructed by the automated driving control unit 310.

The transmission control unit 330 comprehensively controls a transmission that shifts (decelerates or accelerates) rotation of an output shaft of the engine and auxiliary devices of the transmission.

The transmission control unit 330 performs, for example, switching between a drive range and a non-drive range, switching between forward traveling and rearward traveling, and shifting (changing of transmission ratio) during forward traveling in response to an instruction from the automated driving control unit 310.

The brake control unit 340 controls a braking force of a hydraulic service brake provided in each of the wheels of the vehicle.

The brake control unit 340 adjusts a brake fluid pressure supplied to respective wheel cylinders of the wheels in accordance with a requested braking force instructed by the automated driving control unit 310, and generates a necessary braking force.

In the second embodiment, even during the automated driving in which the driver basically does not perform the steering operation, an instruction value of the requested steering angle transmitted from the automated driving control unit 310 to the electric power steering control unit 90 is set as an input (a parameter that correlates with the steering angle of the steering device) to the information transmission apparatus 100. The first gain adjustment is performed based on the derivative value of the input.

According to the second embodiment described above, even in the vehicle performing the automated driving, a sound is generated in accordance with the absolute value of the derivative value of the steering angle and the positional relationship between the neutral steer point NSP and the seating position at the time of starting the steering by the automated driving control. This allows the occupant to predict the occurrence of the vehicle behavior involving the occurrence of, for example, the lateral acceleration rate, the yaw rate, and the roll angle. This makes it possible to prevent the occupant from feeling a sense of abruptness on the behavior of the vehicle.

Modification Examples

The invention is not limited to the above-described embodiments, and various modifications and changes are possible, which are also within the technical scope of the invention.

(1) The configurations of the information transmission apparatus and the vehicle are not limited to the above-described embodiments, and may be changed as appropriate.

For example, the number and the arrangement of the seating positions in the vehicle compartment and the arrangement of the speakers corresponding thereto may be appropriately changed from the configuration of the embodiment.

Further, a hardware configuration of the information transmission apparatus and a specific method of the gain adjustment (changing of the amplitude) of the vibration waveform are not limited to the configuration of each of the embodiments, and may be changed as appropriate.

(2) In each of the embodiments, for example, the steering angle (the actual steering angle detected by the steering angle sensor or the requested steering angle in the automated driving control) is used as the parameter that correlates with the steering amount of the steering device; however, the parameter is not limited to this and may be changed as appropriate.

The parameter may include at least one of, for example, a steering torque (an input torque) inputted by the driver, an operation amount of the actuator that steers the wheels (a rotation amount of a motor as an example), and an output instruction value to the actuator.

(3) The invention may be applied not only to a vehicle in which an operation member such as a steering wheel and a steering mechanism unit such as a steering gearbox are mechanically coupled as in each of the embodiments, but also to a vehicle including a steering device of a steer-by-wire type in which the steering wheel or the like and the steering mechanism unit are not mechanically coupled. In this case, the actual steering angle of the front wheels and the state of the steering mechanism unit (for example, the rotation angle position of the pinion gear and a moving amount of the rack shaft) may be used as the parameter that correlates with the steering amount of the steering device.

(4) In each of the embodiments, the level of the background noise of the vehicle is acquired by the microphone as an example, but the present invention is not limited thereto, and the level of the background noise may be acquired by another method. For example, the level of the background noise may be estimated based on the acceleration rate of an unsprung portion of the vehicle that correlates with an input from a road surface or an output value (a torsion bar torque) of the torque sensor of the steering device.

DESCRIPTION OF REFERENCE NUMERALS

1 Electric power steering apparatus
W Wheel
10 Steering wheel
20 Steering shaft
21 Intermediate shaft
22 Pinion shaft
23, 24 Universal joint
30 Rack shaft
31 Rack gear
40 Rack housing
41 Rack boot
50 Tie rod
51, 52 Ball joint
60 Housing
71 Steering angle sensor
72 Torque sensor
80 Actuator unit
81 Motor
82 Gear box
90 Electric power steering control unit
100 Information transmission apparatus
110 Waveform generator
120 Differential calculator
130 First gain adjuster
140 Microphone
150 Sensing value calculator
160 Second gain adjuster
170 Neutral steer point calculator
180 Yaw rate sensor
190 Vehicle speed sensor
200 Third gain adjuster
210 Fourth gain adjuster
220 Fifth gain adjuster
230 Load sensor
240 Speaker
300 Automated driving system
310 Automated driving control unit
320 Engine control unit
330 Transmission control unit
340 Brake control unit

The invention claimed is:

1. An information transmission apparatus configured to be provided on a vehicle that comprises a steering device configured to steer a wheel, the information transmission apparatus comprising:
a parameter detector configured to detect a value of a parameter that correlates with a steering amount of the steering device;
a vibrator configured to vibrate air around an occupant based on a predetermined vibration waveform in accordance with a change in the value of the parameter;
a calculator configured to determine a neutral steer point, the neutral steer point being a point at which a yaw moment of the vehicle caused by cornering forces generated by front wheels and rear wheels is balanced; and
a gain adjuster configured to adjust an output gain of the vibration waveform in accordance with a relative position between the neutral steer point and a seating position of the occupant.

2. The information transmission apparatus according to claim 1, wherein the gain adjuster is configured to change the output gain in accordance with a change in a distance between the neutral steer point and the seating position.

3. The information transmission apparatus according to claim 2 wherein the gain adjuster is configured to reduce the output gain in accordance with an increase in an angular difference between a slip angle of a body of the vehicle and an angle defined by a straight line that couples the neutral steer point rotation center and the seating position with respect to a center line of the body of the vehicle in a plan view.

4. The information transmission apparatus according to claim 2, wherein
the seating position comprises a plurality of the seating positions,
the vibrator comprises a plurality of the vibrators provided corresponding to the seating positions, and
the vibration waveform to be outputted from each of the vibrators comprises an amplitude that is to be varied in accordance with the relative position between the neutral steer point and the corresponding seating position.

5. The information transmission apparatus according to claim 2, wherein the vibration waveform comprises a dominant frequency comprised in a frequency band of 100 to 400 Hz.

6. The information transmission apparatus according to claim 2, wherein the vehicle comprises an automated driving control unit configured to instruct the steering device on the steering amount, and the parameter that correlates with the steering amount of the steering device comprises an instruction value from the automated driving control unit.

7. The information transmission apparatus according to claim 1 wherein the gain adjuster is configured to reduce the output gain in accordance with an increase in an angular difference between a slip angle of a body of the vehicle and an angle defined by a straight line that couples the neutral steer point and the seating position with respect to a center line of the body of the vehicle in a plan view.

8. The information transmission apparatus according to claim 1, wherein the seating position comprises a plurality of the seating positions, the vibrator comprises a plurality of the vibrators provided corresponding to the seating positions, and the vibration waveform to be outputted from each of the vibrators comprises an amplitude that is to be varied in accordance with the relative position between the neutral steer point and the corresponding seating position.

9. The information transmission apparatus according to claim 1, wherein the vibration waveform comprises a dominant frequency comprised in a frequency band of 100 to 400 Hz.

10. The information transmission apparatus according to claim 1, wherein the vehicle comprises an automated driving control unit configured to instruct the steering device on the steering amount, and the parameter that correlates with the steering amount of the steering device comprises an instruction value from the automated driving control unit.

11. The information transmission apparatus according to claim 1, further comprising:

a microphone configured to collect background noise in a vehicle compartment; and a second gain adjuster configured to adjust the output gain in accordance with a value indicating a sound pressure of the background noise.

12. The information transmission apparatus according to claim 11, further comprising:

a sensing value calculator configured to extract a component in a predetermined frequency band from the background noise, wherein the value indicating the sound pressure of the background noise comprises a sound pressure of the extracted component.

13. The information transmission apparatus according to claim 11, wherein the microphone is disposed at a position close to an ear of the occupant.

\*    \*    \*    \*    \*